July 15, 1941. E. A. FIELDING 2,249,649
FATIGUE TESTING APPARATUS
Filed Nov. 20, 1937 4 Sheets-Sheet 1
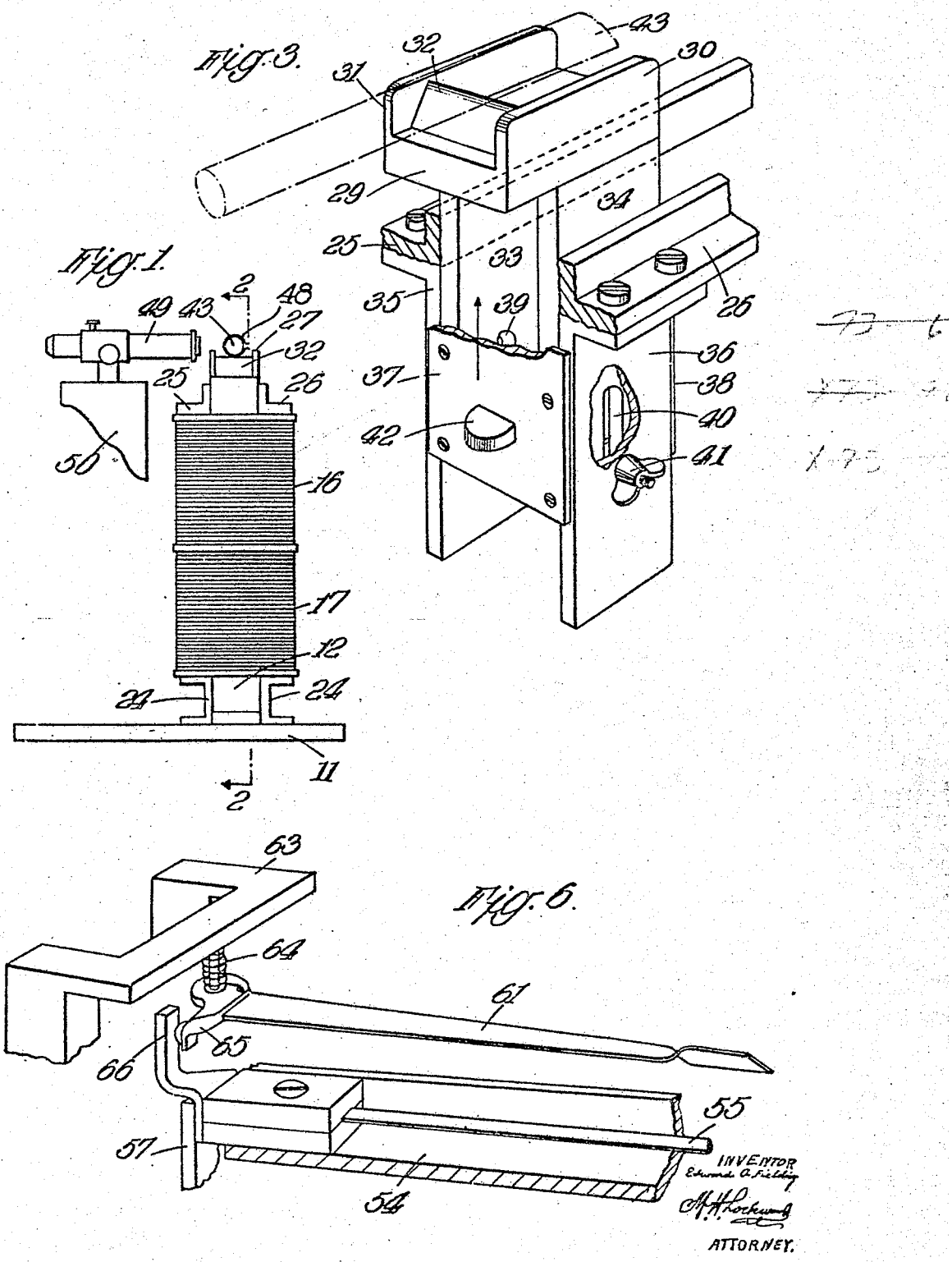

July 15, 1941.　　　　E. A. FIELDING　　　　2,249,649
FATIGUE TESTING APPARATUS
Filed Nov. 20, 1937　　　4 Sheets-Sheet 2
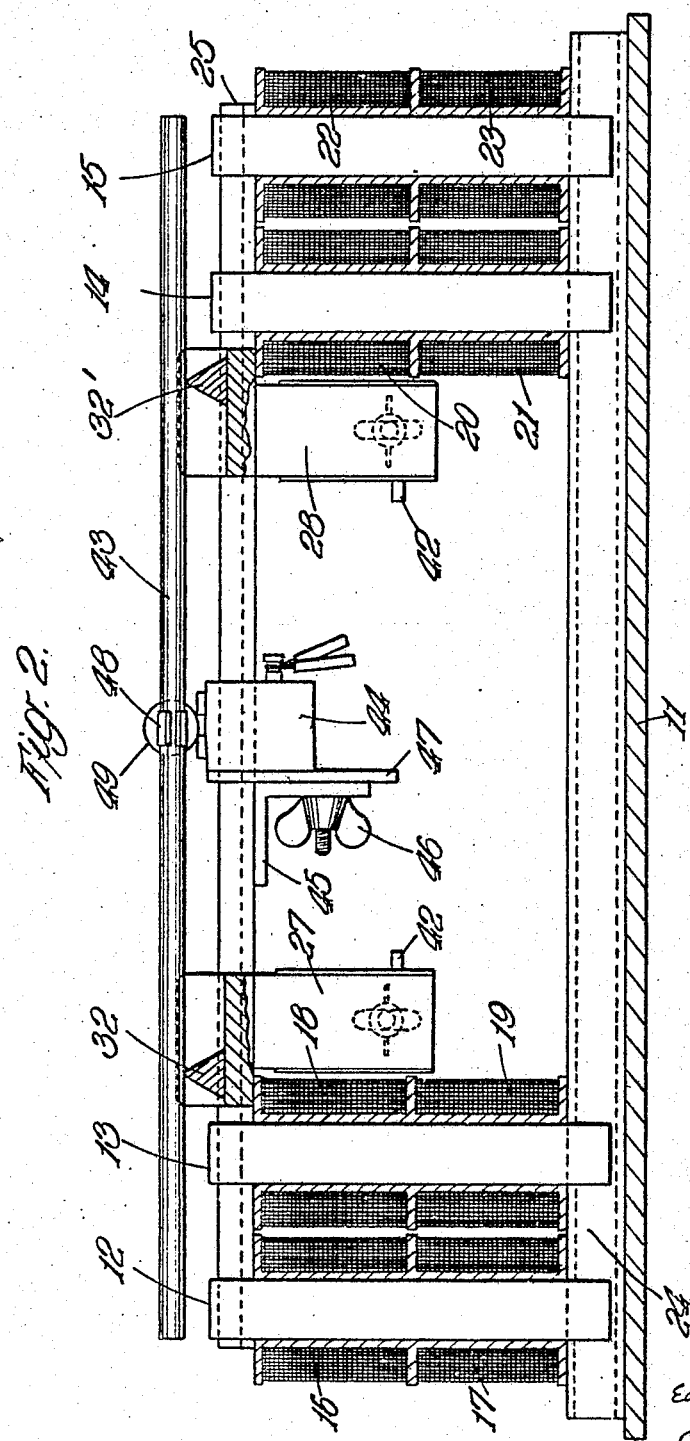

July 15, 1941.　　　　　E. A. FIELDING　　　　2,249,649
FATIGUE TESTING APPARATUS
Filed Nov. 20, 1937　　　4 Sheets-Sheet 3
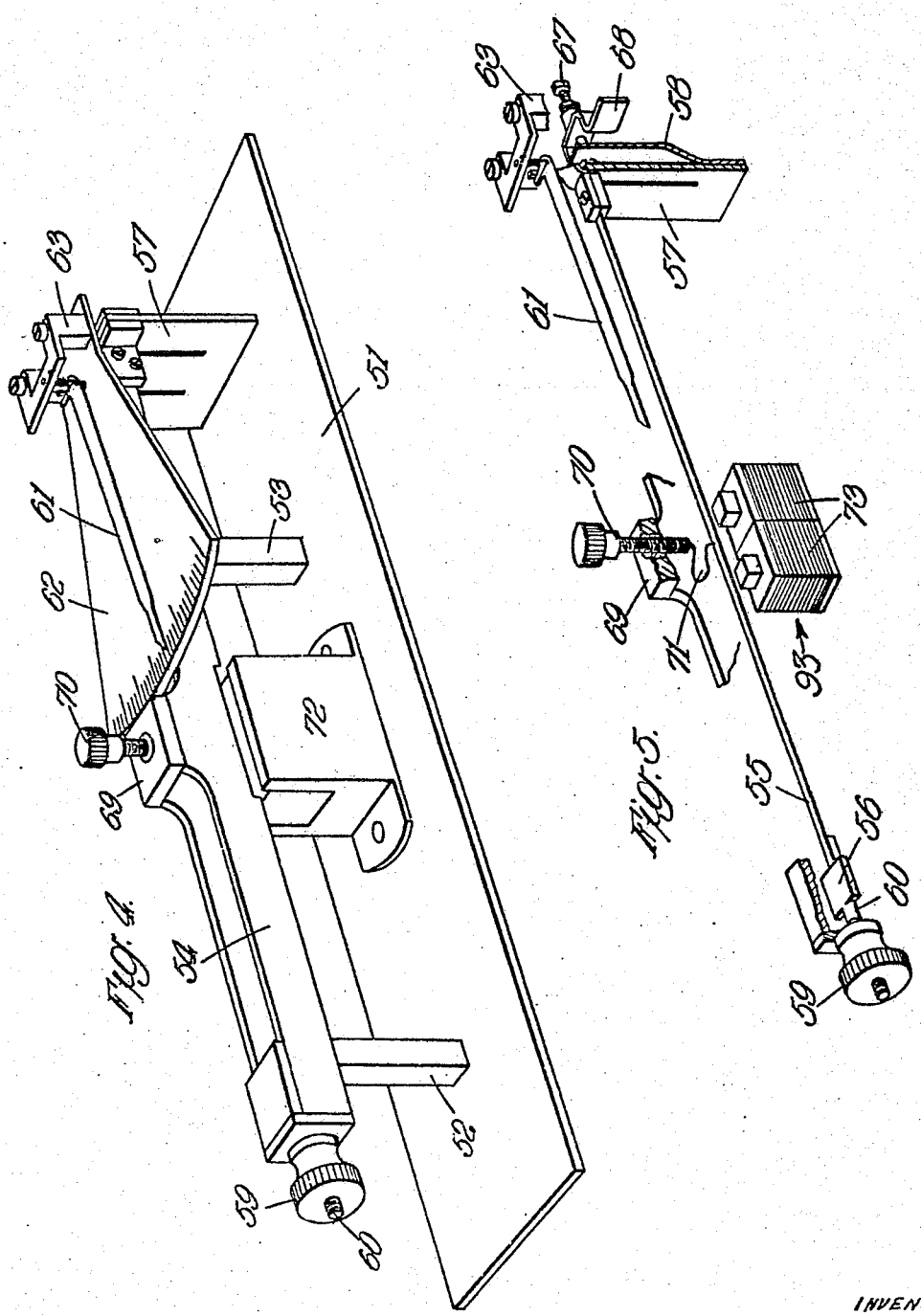

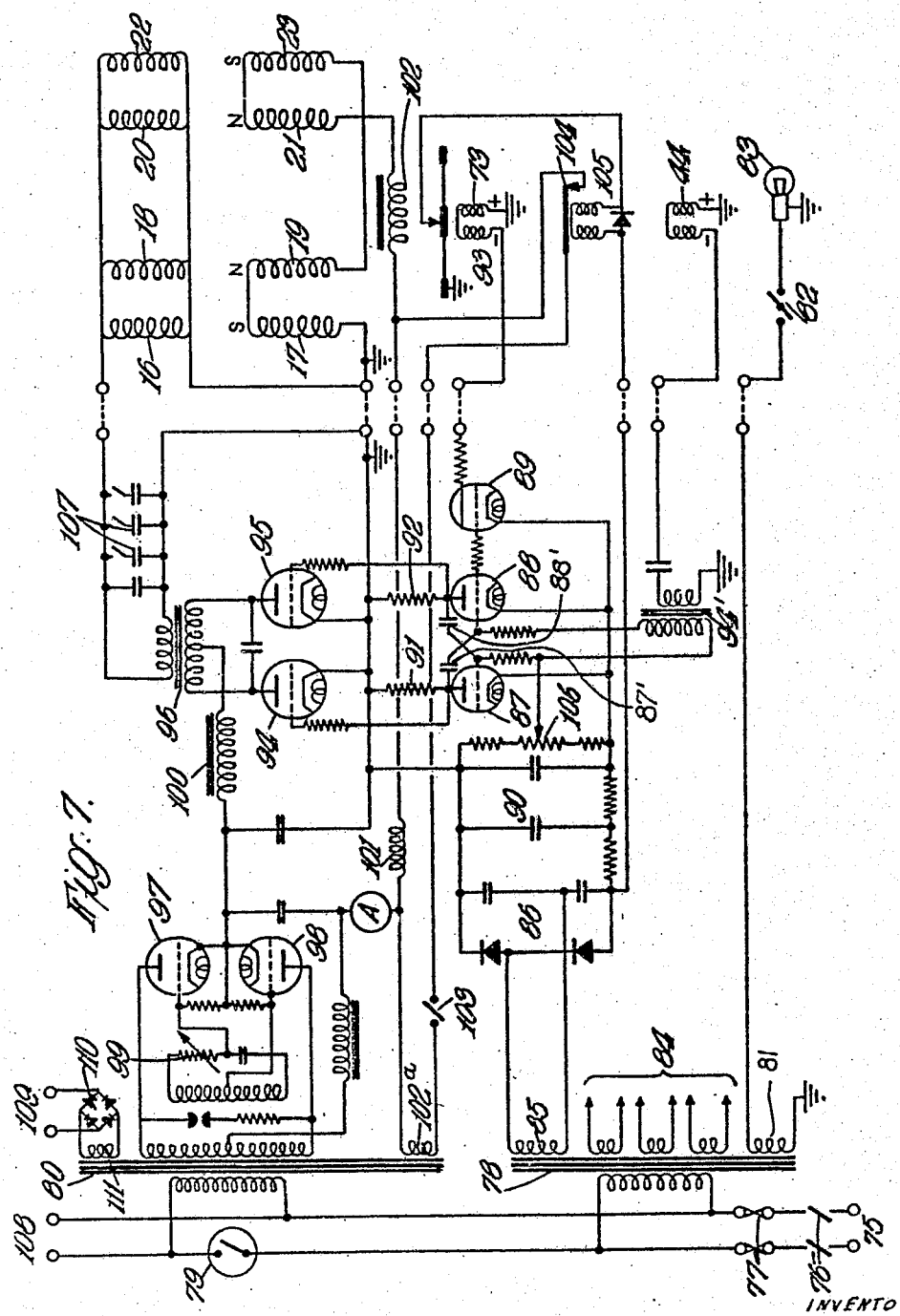

UNITED STATES PATENT OFFICE 2,249,649

FATIGUE TESTING APPARATUS

Edward Armitage Fielding, Oldham, England

Application November 20, 1937, Serial No. 175,559

5 Claims. (Cl. 73—51)

My invention relates to the construction and operation of fatigue testing apparatus.

An important object of the present invention is to provide fatigue testing apparatus which will enable the properties of a specimen to be determined accurately and with greater rapidity than was heretofore possible.

A further object of the present invention is to provide fatigue testing apparatus wherein there are no moving parts which require attention or maintenance beyond the specimen under test.

A still further object of the present invention is to provide fatigue testing apparatus which will test specimens of a very simple shape so that, the costly machining operations on specimens which hitherto have been necessary, are avoided.

Yet another object of my invention is to provide fatigue testing apparatus which automatically discontinues the test, when failure occurs in the specimen under test, or at any desired stage in the development of the failure in the specimen.

Another object of my invention is to provide fatigue testing apparatus and a method of operation which will cause a specimen to undergo extremely rapid reversals of stress at any desired and constant maximum value of stress.

Another object of my invention is to provide electrical means for causing a specimen to vibrate in the "free-free" mode of vibration and at any desired amplitude in order that the resistance to fatigue of the specimen may be determined.

Other objects and advantages of my invention will become apparent during the course of the following description of the invention.

In the accompanying drawings forming part of this specification wherein for the purpose of illustration is shown a preferred embodiment of the invention.

Figure 1 is an end elevation of part of the testing apparatus,

Figure 2 is a vertical longitudinal section on the line 2—2 of Figure 1,

Figure 3 is a perspective view of a portion of the apparatus shown in Figures 1 and 2, parts thereof being shown cut away for greater clearness, Figure 4 is a perspective view of a relay, Figures 5 and 6 are perspective views of fragmentary portions of the relay, and Figure 7 is a circuit diagram showing the electrical connections of the testing apparatus and of the power supply therefor.

In Figures 1, 2 and 3 of the drawings, the numeral 11 designates a bed plate upon which are mounted vertically the pole pieces 12, 13, 14 and 15 which in conjunction with the coils 16 and 17, 18 and 19, 20 and 21, and, 22 and 23 form electromagnets. The pole pieces are rigidly secured on to the bed plate 11 by means of angle girders 24 arranged, on either side of the pole pieces and bolted thereto and onto the bed plate. The upper ends of the pole pieces are similarly secured in position by bolting them between angle girders 25 and 26 of non magnetic material.

The numerals 27 and 28 designate adjustable carriers which are slidably mounted between the angle girders 25 and 26 adjacent the pole pieces 12, 13 and 14, 15 respectively, so that their vertical height may be adjusted. The carrier 27 which is similar in construction to the carrier 28 is shown more clearly in Figure 3 and consists of a flat head portion 29 with upturned side members 30 and 31 forming a space containing a wedge shaped rubber rest 32 which is movable longitudinally on the head portion 29. The head portion 29 is formed with side members 33 and 34 which extend downwards between the angle girders 25 and 26 and the plates 35 and 36 attached thereto, and locating members 37 and 38 are secured to the side members 33 and 34 to position the side members 33 and 34 within the plates 35 and 36 for vertical adjustment of the carrier 27. The vertical movement of the carrier 27 is limited by means of slots 39 and 40 formed in the side members 33 and 34. of the carrier 27 engaging with the shanks of thumb screws 41 and lugs 42 are provided on the locating members 37 and 38 for the manual adjustment of the carrier.

The numeral 43 designates a rod of the material, the fatigue properties of which are to be tested. This bar rests upon the wedge shaped rubber rests 32 and 32' which are carried on the head portions of the carriers 27 and 28 respectively. Underneath the middle of the rod 43 is arranged a pick up coil 44. This coil consists of a U shaped permanently magnetised iron core having coils wound round the limbs and it is adjustably supported between the angle girders 25 and 26 by means of the slotted angle bracket 45, the thumb screw 46 and a plate 47 so that by loosening the thumb screw the vertical position of the ends of the U shaped core with respect to the rod 43 may be varied. Secured to the middle of the rod 43 is a spring clip 48 having on one side a small gold bead which is observed through a low power microscope 49, fixed on a support 50 secured to the bed plate 11 of the machine.

Figures 4, 5 and 6 show the construction of a tuned relay which forms part of the testing machine equipment and which may be secured if desired to the bed plate 11 in part of the magnet structure. The relay comprises a base plate 51, supports 52 and 53 carrying a rectangular channel shaped member 54. Within this member is a thin metal tape 55, secured at one end to a block 56 slidably mounted within the member 54, and, at the other end thereof, to the upper end of a strip 57 which forms part of the vertical plate 58 secured to the base plate 51. The vertical plate 58 is formed of resilient material and by the adjustment of the nut 59 on the screw threaded shaft 60 extending from the block 56, the tension in the metal tape 55 may be varied. The degree of tension in the tape 55 is indicated by means of the movement of a pointer 61 over the scale 62 which is carried on the channel shaped member 54. The pointer 61 is pivotally mounted on the bracket 63 secured to the scale 62, and a spring 64 is provided so that a projection 65 on the pointer is held against an upwardly directed projection 66 secured to the upper end of the resilient strip 57. In this way as the tension in the metal tape 55 is increased by means of the nut 59 the consequential inward movement of the resilient strip 57 causes the pointer 61 to travel across the scale. Outward movement of the strip 57 when the tension is released is limited by a back stop 67 secured on a bracket 68 to the plate 58.

Supported on the channel shaped member 54 is a plate of insulating material 69 which carries an adjustable screw 70 having at its lower end a spring contact 71. The screw 70 may be adjusted to cause the contact 71 to touch the metal tape 55 at a point equidistant from its ends. Situated immediately below the mid point of the tape 55 is a housing 72, secured to the base plate 51, containing a U shaped permanently magnetised iron core the limbs of which project upwards towards the tape 55 and are surrounded by coils 73 to form an electro-magnet.

Figure 7 shows a circuit diagram of the electrical connection of the testing machine and of the power supply and energising circuits therefor. In connection with this figure it is to be understood that those components shown to the right of the vertical row of terminals, connected by the dotted links, are assembled as a unit in the testing machine, while those components shown to the left of said row of terminals are assembled as a separate power unit, the dotted link connections between the terminals representing a cable connecting the two units. Power from alternating current mains connected with terminals 75 is fed through the double pole switch 76 and the fuses 77 to the primary winding of the transformer 78 and through a circuit breaker 79 to the primary winding of the transformer 80. The secondary winding 81 of transformer 78 supplies current through a switch 82 to a lamp 83 mounted on the testing machine. Secondary windings 84 supply current to the heaters of all the vacuum tubes employed and secondary winding 85 supplies current to the rectifier circuit 86 which provides the anode potentials for the tubes 87, 88 and 89 through the smoothing circuit 90 and anode load resistances 91 and 92 to the tubes 87 and 88 and through the windings 73 of relay 93 to the anode of tube 89. The tubes 87 and 88 are connected in push-pull the grids and anodes thereof being cross-connected by condensers 87', 88' to form, in known manner, an oscillator the frequency of oscillation being determined, in a manner to be described hereafter, by a signal induced in the pick-up coil 44 and fed to the grids of tubes 87 and 88 through the transformer 94'. The oscillatory voltage appearing on the grid of tube 88 is fed through the amplifying tube 89 to the windings 73 of the relay 93. The oscillatory voltage appearing in the anode circuits of tubes 87 and 88 is fed in phase opposition directly to the grids of the gas filled amplifying tubes 94 and 95 which are also connected in push-pull and the amplified oscillations are fed through the transformer 96 to the parallel connected coils 16, 18, 20 and 22 of the electro-magnets in the testing machine. Owing to the fact that the coils 16, 18, 20 and 22 are highly inductive, the condensers 107 are provided in parallel with the output winding of transformer 96 so that the inductance can be neutralised over a range of frequency. The anode power supply for the tubes 94 and 95 is obtained from the transformer 80 through a rectifier circuit employing grid controlled gas filled tubes 97 and 98, the output of which being made adjustable in known manner by means of the variable resistance 99. The positive terminal of the rectifier is connected with the anodes of tubes 94 and 95 through the smoothing choke 100 and the primary winding of transformer 96. The negative terminal of the rectifier is connected with the cathodes of tubes 94 and 95 through the ammeter A, trip coil 101 of circuit breaker 79, smoothing choke 102 and the coils 21, 23, 19 and 17 of the electro-magnets in the testing machine. The trip coil 101 is also connected in series with secondary winding 102$^a$ of the transformer 80, switch 103 and the contacts 104 of auxiliary relay 105. The winding of the auxiliary relay 105 is connected, on the one hand, with the negative terminal of the rectifier 86 and, on the other hand with the contacts of relay 93 and the positive terminal of rectifier 86. The method of operation of the testing machine is as follows:—

A bar of the material to be tested is placed upon the rubber rests 32 and 32' the position of the rest being so arranged that they are at the nodes when the bar is set in vibration in the "free-free" mode by the electro-magnets. If necessary the distance between the bar and the upper faces of the magnets is adjusted to be about ¼ of an inch by altering the vertical position of the carriers 27 and 28. The bar is maintained in vibration until failure whereupon the apparatus is automatically switched off. From a knowledge of the stress applied to the bar and the number of reversals before failure the resistance of the material to alternating stresses i. e. its fatigue limit may be estimated. The stress to which the bar is subjected is dependent on the amplitude of vibration. For a uniform bar of magnetic material 18 inches long and ½ inch in diameter the amplitude of vibration to give a particular value of stress is given by $$\text{amplitude (inches)} = \frac{99320 \times \text{stress (tons/sq. inch)}}{\text{Young's modulus (lbs./sq. inch)}}$$

thus for a particular material where Young's Modulus is $27 \times 10^6$ an amplitude of vibration of 0.1 inch will produce a stress of approximately 27.19 tons/sq. inch.

The bar is maintained in vibration by means of the alternating current fed to the coils 16, 18, 20 and 22 by the amplifying tubes 94 and 95 and generated by the oscillating tubes 87 and 88. At the beginning of a test the frequency of oscillation is varied by the grid bias control 106 to the tubes 87 and 88. As soon as the bar is set into oscillation it induces a voltage in the windings of the pick-up coil 44 and this voltage, fed through the transformer 94' to the grids of tubes 87 and 88, causes the oscillator to be locked in step with the vibrations of the bar and at the natural frequency of vibration of the bar. The bar is thus maintained in vibration at a constant frequency and the amplitude of vibration is regulated by adjusting the output of the rectifier tubes 97 and 98 by means of variable resistance 99. This varies both the direct current flowing through the coils 17, 19, 21 and 23 and the alternating current flowing through coils 16, 18, 20 and 22. The object of the direct current supply to the coils 16, 18, 20 and 22 is to ensure that the magnetic field, due to the combined effects of the direct and alternating current supply, can never become zero. The amplitude of vibration is measured by means of the low power microscope 49 in which the image of a gold bead, secured to the bar by means of the spring clip 48, and illuminated by the lamp 83, is seen as a line of light, the length of which is measured against a micrometer scale in the eyepiece.

The frequency at which the bar vibrates may be measured as follows. The windings 73 of the tuned relay 93 are energised from the oscillator by the connection through the amplifying tube 89 and the metal strip 55 (Figures 5 and 6) thus tends to vibrate at the same frequency as does the bar.

The amplitude of vibration of the strip 55 will however be low so long as its natural frequency is different from the frequency of the current in the coil 73 but if the tension of the strip is adjusted so that its natural frequency is the same as the frequency of the current in the coil 73 the amplitude of vibration will become such that the strip touches the spring contact 71 thus closing the circuit of the auxiliary relay 105. This relay closes contacts 104 and hence the circuit including the trip coil 101 and secondary winding 102ª of the transformer 80. This operation in turn causes the circuit breaker 79 to trip, opening the power circuit to transformer 80 and hence causing the forced vibration of the bar to cease. Thus if the scale 62 of the tuned relay be calibrated in cycles per second the frequency of the bar can be quickly determined by varying the tension of the strip 55 until the breaker 79 trips.

During the testing operation, however, the tuned relay 93 serves to switch off the apparatus when the bar under test commences to fail. It is found that as soon as a crack begins to form in the bar its natural frequency of vibration falls becoming lower as the size of the crack increases. The relay is therefore adjusted to have a natural frequency say 5 cycles per second lower than that of the bar. Under these conditions the amplitude of vibration of the strip 55 will be insufficient to bring about contact with the spring contact 71. As soon as the frequency of vibration of the bar falls due to the formation of a crack, the oscillator frequency and hence the frequency of the current in the coils 73 of the relay will also fall and when the frequency falls to the value for which the relay is adjusted, it will come into operation to switch off the apparatus. By suitable adjustment of this relay (93) the switching off of the apparatus may be caused to take place at any instant after the crack in the bar begins to form and before complete failure occurs. The switch 103 in the circuit of the trip coil 101 is provided to enable the trip mechanism to be cut out of action during preliminary adjustment of the apparatus.

The number of reversals of stress to which the bar has been subjected may be conveniently recorded by means of a synchronous clock connected to terminals 108 of the power circuit so that the supply is also interrupted when the breaker 79 trips. Also where several testing machines are being used to provide a series of data at different values of stress they may be connected with a common recorder, preferably one operating on a logarithmic time base, by means of the terminals 109 which deliver a direct current, of suitable voltage to operate the recorder, from the rectifier 110 and secondary winding 111 of transformer 80. In this case also the supply will be interrupted by the operation of the trip mechanism on the failure of the bar under test.

Specimen bars of non magnetic material may also be tested by this apparatus if the bar is provided, at its ends, with steel armatures, and at its centre, with a small steel clip adjacent the pick-up coils. Moreover bars of other than round section and even flat strips may be tested. The formula given above however only applies to bars uniform throughout their length and, for example, in the case of non magnetic specimens, which are only uniform between the nodes, special formulae have to be used.

It is to be understood that the form of my invention, herewith shown and described, is to be taken as a preferred example of the same and that various changes in the shape, size, arrangement of parts and method of operation may be resorted to without departing from the spirit of my invention or the scope of the subjoined claims.

I claim:

1. In apparatus for testing the resistance to fatigue of a specimen by causing it to be maintained in vibration, the combination of a test unit, comprising nodal supports for the specimen, electro-magnets adapted to produce the vibration, a pick-up coil in which a current is induced by the vibration of said specimen; a generator of electrical oscillations, an amplifier for said oscillations, a connection between the output circuit of said amplifier and said electromagnets, a connection between said pick-up coil and the circuit of said generator; a power supply for said amplifier comprising a grid controlled gas filled rectifier, a circuit breaker, having a trip coil, connected with the input to said rectifier; a frequency responsive device connected with said generator, a relay controlled by said frequency responsive device said relay being connected with said circuit breaker.

2. In apparatus for testing the resistance to fatigue of a specimen by causing it to be maintained in vibration, the combination of a test unit comprising nodal supports for said specimen, electro-magnets having alternating and direct current windings, a pick-up coil in which a current is induced by the vibration of said specimen; a generator of electrical oscillations comprising two vacuum tubes, condensers connected between the plate of one tube and the grid of the other tube, a source of plate potential for said tubes, a source of positive grid bias potential, a transformer having a primary and a secondary winding, the primary winding being connected with said pick-up coil, and the secondary winding being connected between the grids of said tubes, an amplifier for said oscillations comprising two gas filled tubes connected in push-pull each having a plate and a grid, the latter being connected with the plate of a corresponding oscillator tube, an output transformer having primary and secondary windings, said primary winding being connected with the plates of said push-pull gas filled tubes and said secondary winding being connected with the alternating current windings of said electro-magnets; a power supply to said amplifier comprising a gas filled rectifier tube having a grid and means whereby the output of said tube may be regulated, a connection between the output circuit of said rectifier and said amplifier, including in series the direct current windings of said electro-magnets; a circuit breaker connected with the input to said rectifier; a frequency responsive device connected with said generator and a relay controlled by said frequency responsive device and connected with said circuit breaker.

3. In apparatus for testing the resistance to fatigue of a specimen by causing it to be maintained in vibration, the combination of a test unit, comprising nodal supports for the specimen, electro-magnets adapted to produce the vibration, a pick-up coil in which a current is induced by the vibration of said specimen; a generator of electrical oscillations, an amplifier for said oscillations, a connection between the output circuit of said amplifier and said electro-magnets, a connection between said pick-up coil and the circuit of said generator; a power supply for said amplifier comprising a grid controlled gas filled rectifier, a circuit breaker, having a trip coil, connected with the input to said rectifier; a frequency responsive device comprising a stretched metal tape, an electro-magnet adjacent said tape, an amplifying tube having a grid and an anode, said grid being connected with said generator and said anode being connected with said electro-magnet, an adjustable contact adjacent said tape, a relay having an energising winding connected with said adjustable contact, contacts on said relay and a connection between said contacts and the trip coil of said circuit breaker.

4. In apparatus for testing the fatigue properties of a specimen by subjecting it to periodic reversals of stress, a test unit comprising a bed plate, two pairs of electro-magnets mounted vertically and in alignment on said bed plate, a frame-work secured to the upper ends of said electro-magnets, adjustable nodal supports for the specimen mounted on said framework, and a pick-up coil adjustably supported on said framework intermediate the pairs of magnets.

5. In apparatus for testing the fatigue properties of a specimen by causing it to vibrate, a source of electrical oscillations comprising two thermionic vacuum tubes each having an anode, a cathode and a control grid, condensers interconnected between the anode of one tube and the control grid of the other tube, a frequency control circuit comprising a source of positive potential and a variable connection between said source and said control grids, means for synchronising said source of oscillations at the natural frequency of vibration of said specimen comprising a transformer having primary and secondary windings, a connection between the ends of said secondary winding and the control grids of said tubes, and a pick-up coil in which a current is induced by the vibration of said specimen connected with the primary winding of said transformer, an amplifier for said oscillations comprising push-pull connected gas filled discharge tubes each having a plate, a control grid and a cathode, an output transformer, electro-magnets having alternating current windings connected with said transformer, condensers adapted to be connected in parallel with said windings, a source of direct current for said amplifier, direct current windings on said electro-magnets connected with said source and means for regulating the output of said source of direct current.

EDWARD ARMITAGE FIELDING.